United States Patent Office 3,093,635
Patented June 11, 1963

3,093,635
PREPARATION OF NITRO DERIVATIVES FROM CYCLIC AMIDES
Berend J. Hoek, Beek, and Johan P. H. von den Hoff and Johannes W. M. Steeman, Geleen, Netherlands, assignors to Stamicarbon N.V., Heerlen, Netherlands
No Drawing. Filed Nov. 14, 1960, Ser. No. 68,589
Claims priority, application Netherlands Nov. 23, 1959
9 Claims. (Cl. 260—239.3)

The present invention relates to the preparation of nitro derivatives from cyclic amides.

According to the invention, it has been found that α-nitro ω-lactams are obtained when 2-chloroazacyclo-2.3-alkene 1-carbochlorides are brought into reaction with nitrating acid, after which the reaction mixture is hydrolyzed with water until no more carbon dioxide is formed.

The 2-chloro-azacyclo-2.3-alkene 1-carbochlorides used in the present invention may be prepared in the manner described in U.S. patent application No. 839,078, filed September 10, 1959, now abandoned.

The α-nitro ω-lactams of the present invention are new substances. They are of importance in that α, ω-diaminocarboxylic acids can be prepared from them by reduction of the α-nitro ω-lactam to α-amino ω-lactam, followed by hydrolysis of the α-amino ω-lactams thus formed.

The nitrating acid used herein is any nitric acid-containing product which is suitable for carrying out nitrating reactions, e.g. nitric acid of 96 to 100% strength. Usually, the nitrating acid will comprise a mixture of concentrated sulphuric acid (e.g. 0 to 95% acid by weight), and concentrated nitric acid (e.g. 100 to 5% acid by weight). Such a mixture usually contains more sulphuric acid than nitric acid, e.g. 1 to 15 moles, typically 2 moles, of sulphuric acid per mole of nitric acid. To obtain high yields with the use of these acid mixtures, it is recommended than an amount of nitrating acid be used corresponding to at least 2 moles of nitric acid per mole of 2-chloro-azacyclo-2.3-alkene 1-carbochloride. However, it is not necessary to use a larger excess than, for instance, 3–5 moles of nitric acid per mole of the compound to be nitrated.

There are advantages in using anhydric nitrating acid in the process of the present invention. The term "anhydric nitrating acid" as used herein is intended to mean a mixture of nitric acid, sulphuric acid and sulphur trioxide which contains at least as many moles of sulphur trioxide as moles of nitric acid. Usually, this mixture will comprise 6 to 18% nitric acid, 60 to 84% sulphuric acid and 9 to 21% sulphur trioxide, by weight. In the present case, satisfactory yields are obtained by using anhydric nitrating acid in amount sufficient to provide 1 mole of nitric acid per mole of the starting product. However, preference is given to using a small excess corresponding to 0.1–0.5 mole of nitric acid per mole of the starting product, since this increases the yield considerably.

The reaction between the carbochloride and nitrating acid can be carried out in any convenient way, e.g. by mixing the reaction components. This reaction is highly exothermic and at high temperatures it may proceed explosively. Accordingly, the temperature is desirably kept below room temperature, i.e., below 20–25° C., to avoid too vigorous a reaction.

Preferably, the 2-chloro-azacyclo-2.3-alkene 1-carbochloride is added gradually to the nitrating acid while the temperature is kept below 15° C., desirably at 0–5° C. A good reaction is furthered if the reaction mixture is stirred vigorously.

After the nitration, the reaction mixture is treated with water thereby hydrolyzing the nitration product. In this step of the process, hydrogen chloride and carbon dioxide are obtained and the hydrolysis is continued until no more carbon dioxide is evolved. At this point, the nitration product has been converted into the desired α-nitro ω-lactam. Usually, from 2 to 200 moles of water per mol of carbochloride starting material are sufficient to effect the desired hydrolysis although it will be appreciated that these proportions can be varied.

The aforementioned hydrolysis can be carried out at room temperature or below. However, the hydrolysis can be accelerated by raising the temperature. Preferably, a temperature of 50–100° C. is maintained, at least during the last stage of the hydrolysis.

The reaction mixture containing whatever excess of the nitrating acid remains and any acids formed by the hydrolysis is strongly corrosive, and it becomes more so as the temperature increases. Accordingly, it is desirable, if the mixture obtained by the nitration is merely treated with water, to make use of enamelled or like non-corrosive reaction vessels.

If metal equipment is used, it is recommended that the hydrolysis, at least as far as it takes place at 50–100° C., be carried out in a weakly acid medium, preferably at a pH of 2–4. It is not desirable to use a pH higher than 4, since byproducts are formed at a higher pH.

In order that the pH may be better controlled, it may be of advantage to carry out the reaction in two or more stages using a low pH of preferably 0.5–2 and a temperature of 20–50° C. in the first stage and a higher pH of preferably 2–4 and a temperature of 50–100° C. in the second stage. Within the indicated ranges, the lower the pH, the lower the temperature that should be utilized in order that corrosion may be restricted as much as possible. If more than two stages are used, the temperature and the pH may increase gradually in the successive stages.

The desired pH may be obtained by adding the appropriate amount of a base, preferably ammonia, to the mixture subjected to hydrolysis. In this connection, it is important that the reaction media should be properly mixed in order to render the pH in the liquid as uniform as possible. This can be effected by vigorous stirring.

It is of advantage if the amount of water required for the hydrolysis is added simultaneously with the base in the form of an aqueous solution of the base. Preferably, the hydrolysis is carried out with an aqueous ammonia solution in the amount necessary to obtain the desired pH and in such a concentration that when the hydrolysis is completed an almost saturated solution of ammonium salts is formed. As a result, the solubility of the α-nitro ω-lactam formed, which is already small, is reduced even further.

In spite of the fact that the reaction mixture is vigorously stirred during the hydrolysis, there may be an excess of ammonia in the place where the ammonia first comes into contact with the liquid in the hydrolyzing vessel. Consequently, the pH may locally be higher than 4, as a result of which side-reactions may take place in which sticky products are formed. These products cause sticky deposits on the walls, stirrer and discharge lines of the vessel. This is objectionable in that it interferes with the regular discharge of the hydrolysis product and the operation of the stirrer. Incomplete stirring may cause local overheating, as a result of which spontaneous, highly exothermic decomposition reactions may take place.

According to another feature of the invention, it has been found that the formation of the abovementioned sticky deposits can be avoided by carrying out the hydrolysis in the presence of one or more solvents, e.g. nitrohydrocarbons such as nitromethane and/or chlorinated hydrocarbons, e.g. carbon tetrachloride and dichloro-ethane. It is not necessary to use these solvents in such large quantities that the solid substances in the hydrolyzing vessel are actually dissolved. Thus, for example, good results are obtained when these solvents are used in quantities of 1–8% by volume of the total amount of liquid present.

The formation of deposits can also be prevented by adding one or more surface active agents to the mixture undergoing hydrolysis. Typically suitable surface active agents are the sulphonated hydrocarbons such as the product known as "Teepol." These agents are effective when used in quantities of 0.01–0.5% by weight of the total amount of liquid.

The $\alpha$-nitro $\omega$-lactams obtained by the present process are only slightly soluble in water. Hence, they can be readily separated from the aqueous reaction medium liquid in any convenient fashion, for instance, by filtration. Any $\alpha$-nitro $\omega$-lactam which may be left in the aqueous liquid may be extracted therefrom by means of a suitable solvent, e.g. methylethyl-ketone.

Any 2-chloro-azacyclo 2.3-alkene 1-carbochloride may be used in practicing the present invention. In other words, the number of carbon atoms in the ring system may be widely varied. Typically, the number of ring carbon atoms may be five, six or seven or even more such as ten, eleven or twelve. Chemical analysis and spectroscopic examination confirm that these 2-chloro-azecyclo-2.3-alkene 1-carbochlorides give corresponding $\alpha$-nitro $\omega$-lactams.

The invention is illustrated, but not limited, by the following examples:

*Example 1*

1.052 g. (5.43 moles) of 2-chloro-azacyclo 2.3-heptene 1-carbochloride and 2.755 g. of anhydric nitrating acid (consisting of a mixture of 20% solution of oleum and a 98% solution of nitric acid, in which nitric acid, sulphur trioxide and sulphuric acid are present in the molar ratio 1:1:3.26, so that the mixture contains 5.93 moles of nitric acid in all) where brought into reaction with each other in a continuous test carried out in a vessel with proper stirring while maintaining the reaction temperature at 4° C. by cooling. The average residence time in this vessel was 42 minutes, the test leasting 316 minutes in all.

After the nitration, the reaction mixture entered the hydrolyzing vessel, where in a continuous process carried out at 70° C. and with vigorous stirring, the resulting nitro compound was hydrolyzed with 6.686 g. of a 15% aqueous solution of ammonia. This solution also served to maintain the pH at a value between 2 and 3. The average residence time of the reaction mixture in the hydrolyzing vessel was 10 minutes.

The formation of sticky deposits was avoided by adding simultaneously with the ammonia solution, 172 ml. of carbon tetrachloride. This is equivalent to 3.3% by volume with respect to the ammonia solution.

After the hydrolysis, the mixture was cooled and the solid substance obtained by the hydrolysis separated from the reaction liquid by filtration. The weight of separated solid was 790 g. According to analysis, 764 g. of this solid comprises $\alpha$-nitro $\epsilon$-caprolactam, a white crystalline substance with a melting point of 162° C. In addition to the separated solid, 30 g. of the hydrolyzed product remained in solution in the filtrate giving a total of 794 g. of $\alpha$-nitro $\epsilon$-caprolactam. Thus, the total yield in the conversion of 2-chloro-azacyclo 2.3-heptene 1-carbochloride to $\alpha$-nitro $\epsilon$-caprolactam was 92.7%.

*Example 2*

Following the procedure outlined in Example 1, 1.103 g. (5.68 moles) of 2-chloro-azacyclo 2.3 heptene 1-carbochloride were nitrated continuously with 2.833 g. of anhydric nitrating acid containing 6.06 moles of nitric acid. The average residence time in the nitrating vessel was also 42 minutes, the test lasting 331 minutes in all.

After the nitration, the reaction mixture was continuously hydrolyzed, with vigorous stirring, at a temperature of 67° C. and a pH of 2–3, with 7.921 g. of a 15% aqueous solution of ammonia, to which 0.1% by weight of a sulphonated hydrocarbon, available under the tradename "Teepol" was added.

After the reaction was finished, it was found that no deposits had been formed. 781 g. of pure $\alpha$-nitro $\epsilon$-caprolactam were isolated in the solid state, 27 g. remaining in solution to give a 90% conversion.

*Example 3*

208 g. of 2-chloro-azacyclo-2.3-octene 1-carbochloride were added slowly over a period of 15 minutes, with simultaneous stirring, to 510 g. of nitrating acid, the temperature being kept at 3° C. In this case, the nitrating acid comprised a mixture of 70 g. of nitric acid, 88 g. of sulphur trioxide and 352 g. of sulphuric acid. After the carbochloride had been added, the stirring was continued for another 10 minutes. Subsequently, the reaction mixture was slowly distributed in 1.5 liters of water and stirred for 0.5 hour at a temperature of 65° C. Then the liquid was cooled down to 10° C., a white solid substance separating out. The solid was separated from the liquid by filtration, washed and dried to give 146 g. of $\alpha$-nitro-oenantholactam.

From the filtered liquid, another 17 g. of $\alpha$-nitro-oenantholactam were extracted by means of methylethyl-ketone while adding 1.100 g. of ammonium sulphate.

In all, 163 g. were obtained corresponding to a yield of 94.8%. This $\alpha$-nitro-oenantholactam can be purified further by recrystallization from water to give a white crystalline substance having a melting point of 140° C.

It will be appreciated that various modifications may be made in the invention described herein without deviating from the scope thereof as defined in the appended claims.

We claim:

1. In a process for preparing $\alpha$-nitro $\omega$-lactam by mixing 2-chloro-azacyclo-2,3-alkene 1-carbochloride containing up to 12 carbon atoms in the ring, with a nitrating acid and then hydrolyzing the resulting product with water, the improvement which comprises carrying out the hydrolysis in at least two stages using a pH of 0.5–2 and a temperature of 20–50° C. in the first stage, and a pH of 2–4 and a temperature of 50–100° C. in the second stage.

2. The process of claim 1 wherein the 2-chloro-azacyclo-2.3-alkene 1-carbochloride and the nitrating acid are mixed together at a temperature of −5 to +15° C.

3. The process of claim 1 wherein the hydrolysis is carried out with an aqueous ammonia solution in the amount necessary to give the pH desired and of such concentration that when the hydrolysis is completed an almost saturated solution of ammonium salt has been formed.

4. The process of claim 1 wherein the hydrolysis is carried out in the presence of at least one solvent.

5. The process of claim 4 wherein hydrolysis is carried out in the presence of a chlorinated hydrocarbon.

6. The process of claim 4 wherein the hydrolysis is carried out in the presence of 1–8% by volume of the solvent.

7. The process of claim 1 wherein the hydrolysis is carried out in the presence of at least one surface-active agent.

8. The process of claim 7 wherein the hydrolysis is carried out in the presence of at least one sulphonated hydrocarbon.

9. The process of claim 1 wherein the α-nitro-lactam is α-nitro-ε-caprolactam and the 2-chloro-azacyclo-2.3-alkene 1-carbochloride is 2-chloro-azacyclo-2.3-heptene 1-carbochloride.

References Cited in the file of this patent

UNITED STATES PATENTS

| | | |
|---|---|---|
| 2,836,599 | Frankel et al. | May 27, 1958 |
| 2,933,491 | Klager | Apr. 19, 1960 |